United States Patent [19]

Prakash

[11] 3,922,370

[45] Nov. 25, 1975

[54] FOOD PRODUCT AND PROCESS FOR PREPARING SAME

[75] Inventor: Vinod Prakash, Winterthur, Switzerland

[73] Assignee: Societe d'Assistance Technique pour Produits Nestle S.A., Lausanne, Switzerland

[22] Filed: Aug. 7, 1974

[21] Appl. No.: 495,416

Related U.S. Application Data

[63] Continuation of Ser. No. 244,289, April 14, 1972, abandoned.

[30] Foreign Application Priority Data

Apr. 19, 1971 Switzerland.......................... 5639/71

[52] U.S. Cl. ................ 426/559; 426/440; 426/458; 426/560; 426/808
[51] Int. Cl.² ............................................ A23L 1/18
[58] Field of Search ........... 426/141, 145, 346, 347, 426/439, 440, 808, 446, 559

[56] References Cited

UNITED STATES PATENTS

| | | | |
|---|---|---|---|
| 3,220,852 | 10/1965 | Gerkens.............................. | 426/272 |
| 3,332,781 | 7/1967 | Benson et al. ...................... | 426/446 |
| 3,539,356 | 11/1970 | Benson et al. ...................... | 426/550 |
| 3,580,728 | 5/1971 | Gulstead et al..................... | 426/289 |
| 3,711,296 | 1/1973 | LaWarre.............................. | 426/499 |

*Primary Examiner*—Raymond N. Jones
*Attorney, Agent, or Firm*—Watson Leavenworth Kelton & Taggart

[57] ABSTRACT

A crisp snack product, in the form of pieces puffed by deep-frying, comprising 25 to 40% by weight of fat, 50 to 75% by weight of gelatinised rice flour and 0 to 10% of flavourings and/or colouring and having a density between 50 and 90 g/liter. A process for preparing the product is also disclosed.

13 Claims, No Drawings

FOOD PRODUCT AND PROCESS FOR PREPARING SAME

This is a continuation of application Ser. No. 244,289, filed April 14, 1972, now abandoned.

This invention is concerned with the production of a crisp snack product from rice. The product may be in the form of pieces having various shapes such as tubes, shells, gnocchis, twists and the like, and such pieces are generally flavoured by addition of spices or flavouring compositions and may also be coloured. Moreover, the product is puffed by deep-frying and thus has a very light crisp texture.

Such snack items are normally prepared from starchy materials such as potato, but it has been found that rice flour provides an excellent base for the preparation of snack products having a desirable light, crisp texture.

According to the invention, a process for preparing a snack product comprises forming a dough from a dry mix comprising at least 70% by weight of rice flour, and water, shaping the dough into separate pieces, subjecting the shaped dough pieces to a heat treatment to gelatinise the starch present, the water content of the dough pieces during the gelatinisation treatment being maintained above 27% by weight, drying the gelatinised pieces to a water content below 15% by weight and optionally deep-frying the dried pieces.

It should be noted that the deep-frying need not be carried out immediately after drying, as the dried pieces are per se a stable intermediate product that may be stored, although, of course, the product is fried prior to consumption. The intermediate product according to the invention is in the form of shaped pieces comprising at least 70% by weight gelatinised rice, 0 to 10% by weight cold swelling starch, 7 to 15% by weight of flavourings and/or colourings and 0 to 15% by weight of water, the rice having been gelatinised after shaping.

The invention also provides a crisp snack product, in the form of pieces puffed by deep frying, containing 25 to 40% by weight of fat, 50 to 75% by weight of gelatinised rice and 0 to 10% by weight of flavourings and/or colouring and having a density between 50 and 90 g/liter.

The starting material for the process of the invention is a rice flour, preferably having an average particle size of about 300 microns. Particularly preferred is a rice flour of which 75% by weight passes through a screen with 439 micron apertures and all remains on a screen with 180 micron apertures. In general, the starch of the rice flour is not gelatinised but, in a variant of the process, a mixture comprising ungelatinised flour and pregelatinised rice flour may be used, with the major proportion of the total rice flour being ungelatinised.

Before forming the dough the rice flour may be dry blended with different flavourings and/or colourings, such as spices and salt, these constituents normally representing 7 to 15% by weight of the blend. In particular, any of the following may be added: spices or mixtures of spices including paprika, curry, caraway, pepper; natural or synthetic flavours such as onion, tomato, cheese, meat or smoked ham; and protein hydrolysates. The flavourings and colouring may alternatively be added to the deep-fried product. The mixture may also comprise small amounts, preferably 1 to 10% by weight, for example 5% by weight, of modified cold swelling starch.

The rice flour, to which have optionally been added flavourings, spices and modified starch, is mixed with water in sufficient quantity to obtain an extrudable dough. The water content of the dough is generally between 25 and 45% by weight, preferably 30 to 38%. The resulting dough is then shaped, for example by extrusion, to provide pieces having any desired shape, and preferably a thickness of 0.5 to 1.5 mm. If extrusion is used, the pressure may be between 20 and 80 kg/cm$^2$ and the temperature of the extruded product is generally not above 40°C. Extrusion produces a continuous ribbon or tube which is cut into pieces, and, according to the die used, the pieces may have the shape of shells, twists, gnocchis, tubes and the like.

After shaping, the pieces are subjected to the gelatinisation treatment. In a preferred embodiment of the process, the product is placed on perforated trays and the treatment is carried out in a chamber or tunnel supplied with saturated or superheated steam. The operation may be performed at a pressure close to atmospheric and generally takes between 2 and 15 minutes, preferably 8 to 12 minutes at around 100°C. During the gelatinisation treatment the water content of the product should be at least 27% by weight and the temperature is desirably maintained above 97°C. The minimum duration of the treatment depends on these two factors but may be prolonged beyond the maximum times indicated above without affecting the quality of the final product.

As the gelatinised pieces are soft and tend to stick together, their separation without damage is facilitated by predrying, preferably at temperatures between 20° and 80°C. for example between about 40° and 50°C. The predrying may advantageously be performed in a recirculating air drier, the product remaining on the trays used for gelatinisation, and the duration of the operation is selected having regard to the air temperature. It is generally between 5 and 30 minutes, whereby the water content of the pieces should desirably be reduced to below 32% by weight.

The predried product is then subjected to a final drying step. This operation may be carried out in a continuous drier comprising a conveyor band on which the predried gelatinised pieces are placed. During the final drying step, the water content of the product is lowered to below 15% by weight. In particular, the water content may be between 5 and 14% by weight, and is preferably 7 to 9%. The drying may normally be performed at any temperature between 20° and 90°C but, preferably, the temperature is maintained relatively low, between 40° and 50°C. The duration of the operation is related to the temperature; for the values indicated above, it is between about 3 and 4 hours. The dried pieces are a useful intermediate product, and they may be stored in appropriate air-tight containers.

The final snack product is obtained by deep-frying the dried pieces. The frying is preferably carried out by immersing the pieces in a bath of oil or fat which is held at between 180° and 230°C, for 4 to 14 seconds. Good results are obtained by deep-frying in fat heated to 200° to 210°C, the contact time of the shapes with the fat being limited to 5 to 7 seconds.

The fried product is in the form of attractive puffed pieces having a volume which is 4 to 7 times that of the unfried product. The pieces have a crisp texture and a very pleasant flavour. They are very light, their density lying between 50 and 90 g/liter, as compared with 250 to 300 g/liter for the dried intermediate product. The low density is attained despite adsorption of fat during frying, which may represent 25 to 40% by weight of the finished product, and is directly attributable to the excellent puffing properties of rice flour. One particular feature of the product is its stability, in that if packed in appropriate containers, it retains its properties after prolonged storage at ambient temperature.

The invention is illustrated by the following example, in which the percentages are by weight.

EXAMPLE

The starting material is a rice flour the particle size distribution of which is as follows:

| Screen (size of apertures in microns) | Product retained (%) |
|---|---|
| 560 | 0.5 |
| 535 | 1.0 |
| 439 | 5.0 |
| 320 | 31.5 |
| 225 | 24.0 |
| 180 | 18.0 |
| 125 | 4.5 |
| 105 | 7.5 |
| fines | 8.0 |

The following ingredients are dry blended in a mixer:
8.5 kg of rice flour
0.5 kg of modified cold swelling starch
1.0 kg of an onion flavour composition,
then 3.6 liters of water at 20°C are added to the dry blend (moisture content 10%). The mix is stirred for about 1 minute to form a coarse dough containing about 34% of water.

The dough is fed into a screw extruder for pasta products which has a head provided with 10 annular dies 0.7 mm in thickness. The extrusion pressure is 55 kg/cm² and the dies shape the product into gnocchis, which are joined end to end and severed at the exit of the head with a rotating knife.

The dough shapes are placed on perforated trays which are fed into a tunnel supplied with saturated steam. The product is treated at atmospheric pressure for 12 minutes, at about 100°C, to obtain gelatinisation of the starch. The steam passes from below and because of the large number of openings in the trays, the gnocchis are in contact with steam over most of their surface. During the whole length of the treatment, the water content of the product is around 32%.

The trays of gelatinised product are loaded into a recirculating air drier where the moisture content of the shapes is lowered to about 23 to 25%. The predrying is carried out at a temperature of 45°C. for about 20 minutes. The predried product may then be removed from the trays without damage and fed directly to a continuous drier. The final drying is carried out at 45°C for 3 hours and 50 minutes. At the end of this operation, the moisture content of the product is reduced to 7 to 8%.

The pieces of gelatinised and dried dough are then deep-fried by immersion for about 4 seconds in fat heated to 207°C. The fried pieces have a fat content of 29%.

The product has a very attractive appearance (shape, colour) and the gnocchi-shaped pieces have a smooth uniform surface. The density of the product is 65 g/liter, the texture is firm and crisp and the flavour very pleasant. Suitably packed, the product retains its properties after a storage period of more than 3 months at ambient temperature.

I claim:

1. A process for preparing a snack product which comprises forming a dough by mixing together water and a dry mix comprising at least 70% by weight of rice flour a major proportion of which is ungelatinised, shaping the dough into separate pieces, subjecting the shaped dough pieces to a heat treatment to gelatinise the starch present, the water content of the dough pieces during the gelatinisation treatment being maintained above 27% by weight, and drying the gelatinised pieces to a water content below 15% by weight.

2. A process according to claim 1 in which water is mixed with the rice flour in sufficient quantity to provide a dough having a water content of 25 to 45% by weight.

3. A process according to claim 1 in which water is mixed with the rice flour in sufficient quantity to provide a dough having a water content of 30% to 38% by weight.

4. A process according to claim 1 in which the dough mix is shaped by extruding it in a continuous ribbon thereof at a pressure of 20 to 80kg/cm² and a temperature not above 40°C., the continuous ribbon being cut into separate shaped pieces having a thickness of 0.5 to 1.5 mm.

5. A process according to claim 1 in which the gelatinisation treatment is effected at a temperature of at least 97°C.

6. A process according to claim 3 in which the gelatinised pieces are dried in two successive drying steps, the water content of the pieces being reduced to below 32% by weight in the first drying step and to between 5% to 14% by weight in the second step.

7. A process according to claim 6 in which the first drying step is effected at a temperature of 20 to 80°C. and the second at a temperature of 20 to 90°C.

8. A process according to claim 1 in which the drying is effected at a temperature of 40 to 50°C.

9. A process according to claim 1 in which the starch present in the rice flour is gelatinised by contacting the shaped dough pieces with steam.

10. A process according to claim 9 in which the steam is saturated steam, the gelatinisation treatment being effected at about 100°C. with the water content in the shaped dough pieces being maintained at about 32% by weight during the gelatinisation treatment.

11. A process according to claim 1 wherein the dried, gelatinised pieces are deep-fried.

12. A snack product prepared by the process of claim 1.

13. A snack product prepared by the process of claim 11.

* * * * *